Jan. 29, 1929.
R. H. GODDARD
1,700,675
VAPORIZER FOR USE WITH SOLAR ENERGY
Filed May 27, 1927
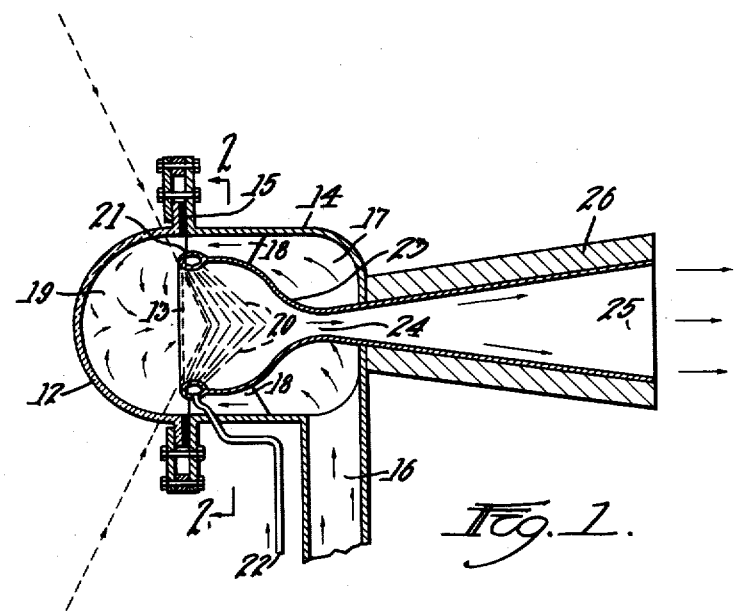
Fig. 1.
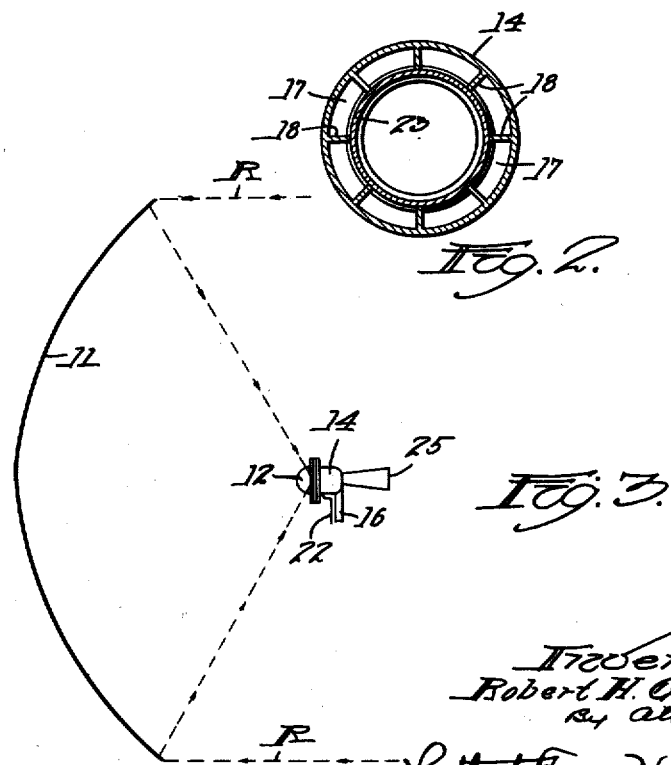
Fig. 2.
Fig. 3.

Patented Jan. 29, 1929.

1,700,675

UNITED STATES PATENT OFFICE.

ROBERT H. GODDARD, OF WORCESTER, MASSACHUSETTS.

VAPORIZER FOR USE WITH SOLAR ENERGY.

Application filed May 27, 1927. Serial No. 194,823.

This invention relates to a construction by means of which radiant energy from the sun may be readily absorbed by a suitable liquid, which is thereby converted into steam or vapor.

The general object of the invention is to provide means by which radiant energy from the sun may be used to convert a liquid into vapor in a limited space or area, but at which the rapid flow of the liquid prevents an excessively high temperature, notwithstanding the high concentration of solar energy. A further object is to provide improved means for localizing the heat absorption and for preventing re-radiation thereof.

One form of the invention is illustrated in the accompanying drawings in which—

Fig. 1 is a vertical section through the vaporizer;

Fig. 2 is a transverse vertical section, taken along the line 2—2 in Fig. 1; and Fig. 3 is a diagrammatic view of the vaporizer on a reduced scale and showing means for concentrating the solar energy thereon.

Referring to the drawing, the rays or elements R of solar energy are reflected from a parabolic mirror 11 (Fig. 3) and after passing through a window 12 of glass or quartz, preferably of hemispherical form, said rays come to a focus in the area or locus 13 (Fig. 1). The window 12 is bolted to an outer casing 14, with a packing-ring 15 inserted between.

The liquid to be vaporized, as water, enters the vaporizer through a pipe 16, (Fig. 1) and preferably passes through a water jacket 17, and between guides or partitions 18 (Fig. 2), which direct the liquid in stream-lines parallel to the axis of the vaporizer to the space 19 inside of and adjacent the window 12.

As a liquid enters the region of the focus 13 of the mirror 11, it is preferably mixed with a liquid having different optical properties, such as mercury, which enters in the form of fine streams 20 from a hollow ring 21, this second liquid being introduced under pressure through a pipe 22. The main liquid to be vaporized, as water, should also enter the vaporizer under pressure supplied by any available means.

Where the streams of liquid mix, at or near the focus 13, the mixture becomes opaque to radiation, owing to reflections and refractions at the multitude of minute surfaces of contact between the liquids of different optical properties. The speeds at which the liquids enter the focus are selected to permit complete evaporation of either or both liquids, as desired.

An inner casing member 23 is supported by the inner ends of the guides or partitions 18, said casing member being preferably bell-shaped, with a constricted outlet passage 24 opening into an expansion nozzle 25, which may be surrounded by a heat-insulating jacket 26. The hollow ring 21 previously mentioned forms the edge portion of the casing member 23. The nature of the inner surface of the casing member 23 is of little consequence, as little direct radiation reaches it, but it may preferably be smooth and polished.

The increase in volume, produced by vaporization, results in a greatly increased speed of flow of the vapor through the constricted passage 24, from which the vapor emerges at a high speed. The vapor commonly flows from the passage 24 directly into the expansion nozzle 25, from which it is drawn away to be utilized, but the nozzle may be at times omitted.

The vapor, emerging from the nozzle at very high speed, may be used to operate a turbine (preferably a single stage turbine of small bulk, to avoid any considerable cutting-off of the rays R of solar energy from the mirror 11), or it may be used for any other purpose where a high-velocity stream of gas or vapor is desirable. The vapor emerging from the passage 24 may be delivered direct to a reciprocating engine, but this plan reduces the heat efficiency.

The vapor, after being used in a turbine or other device, may be led to a condenser, from which the two liquids, as water and mercury, may be separated by any well known means, as by gravity or by centrifugal separators.

A very important advantage of the vaporizer herein described results from the mixing of the liquids substantially at the focus of the mirror, as substantially all of the energy is taken up by the liquid stream itself, and the heat-absorption is substantially instantaneous, and does not involve the loss of time which is demanded by other methods, such as flow of liquid through heated pipes.

This complete and instantaneous absorption of heat makes it possible to place the expansion nozzle close to the focus, so that the distance through which the heated stream of vapor passes can be made very small, and the heat loss, from the time the liquid is vaporized to the time when it is used, is reduced to a minimum.

A further important advantage is that most of the heat is absorbed at the focus, and only relatively cool liquid is in contact with the window. This not only serves to maintain all parts of the window cool, but it also prevents loss of heat from the focus by re-radiation backward toward the mirror, for the reason that the heat absorbed at the focus produces only relatively long heat waves, which are wholly absorbed by the water that is approaching the focus.

An additional advantage lies in the hemispherical shape of the window 12, which permits the employment of the least thickness for a given pressure, and which cannot become intensely heated at any point, since it is much larger than the focus.

Another advantage lies in the continuous stream-line flow from the point where the vapor begins to be heated to the point where it is used in the turbine, or other apparatus. The water jacket around the casing member 23 prevents loss of heat by conduction.

The combination of the small area of heated surface, the short travel of heated vapor, the lack of appreciable re-radiation, and the stream-line flow, reduces heat losses to a minimum, and makes possible a thermodynamic efficiency which is unusually high for a heat engine, besides permitting the apparatus to be compact and of very light weight, particularly for a solar vaporizer.

It is evident that various modifications can be made without departing from the essential nature of the invention. Thus the liquid to be vaporized may consist of a mixture of liquids, or of a liquid with a finely-divided solid substance, such as carbon, in suspension. Further, it may consist of a liquid of much higher boiling point and lower freezing point than water, such as isobutyl alcohol or diethyl aniline, so that the thermodynamic efficiency may be made high by heating the vapor to a high temperature, and condensing at a low temperature.

The shape and cross section of the parts and the number and arrangement of mirrors may be widely varied, and the heat may be focused in a line instead of a point. Many other changes may be made in my invention by those skilled in the art, within the spirit and scope thereof, as set forth in the claims, and I do not wish to be otherwise limited to the details herein disclosed, but what I claim is:—

1. A vaporizer for use with solar energy having means for focusing the rays of solar energy, means to deliver a heat-absorbing liquid to said vaporizer, and means to mix a second liquid therewith substantially at the focal point.

2. A vaporizer for use with solar energy comprising means for focusing the rays of solar energy, and means for absorbing the rays of solar energy in a heat-absorbing liquid substantially at the focal point, said liquid having a second liquid of different optical properties mixed therewith.

3. A vaporizer for use with solar energy comprising means to concentrate said energy at a limited area, and means to supply an intimate mixture of liquids of different optical properties at said limited area.

4. A vaporizer for use with solar energy having means for focusing the rays of solar energy, means to deliver a heat-absorbing liquid to said vaporizer, and means to mix a second liquid of different optical properties therewith substantially at the focal point.

5. A vaporizer for use with solar energy comprising a casing member, means to concentrate said energy at a locus substantially within said casing member, means to cause a heat-absorbing liquid to flow through said locus, and means to introduce a second liquid thereto substantially at said locus of energy concentration.

6. The combination in a vaporizer as set forth in claim 5, in which said casing member has a constricted outlet passage from which the vaporized liquid flows at relatively high speed.

7. The combination in a vaporizer as set forth in claim 5, in which said casing member has a constricted outlet passage from which the vaporized liquid flows at relatively high speed, and an expansion nozzle connected with said outlet passage.

8. The combination in a vaporizer as set forth in claim 5, in which said casing member has a constricted outlet passage from which the vaporized liquid flows at relatively high speed, and in which said outlet passage is jacketed by one of said liquids.

9. The combination in a vaporizer as set forth in claim 5, in which said casing member has a constricted outlet passage from which the vaporized liquid flows at relatively high speed, and an expansion nozzle connected with said outlet passage, and in which said expansion nozzle is provided with a heat-insulating jacket.

10. The combination of a vaporizer as set forth in claim 5, in which an annular tube is provided through which said second liquid is introduced, said annular tube forming the inner edge portion of said casing member and having a number of relatively fine perforations through its inner wall.

11. A vaporizer for use with solar energy comprising an outer casing, an inner casing member, guiding partitions connecting said casing and casing member, a transparent closure for the end of said outer casing, and means to direct concentrated solar energy through said transparent closure to a focal point substantially within said inner casing member.

12. A vaporizer for use with solar energy comprising an outer casing, an inner casing member, a substantially hemispherical transparent closure fixed to said outer casing, means to concentrate solar energy at a locus within said transparent closure and substantially within said inner casing member, and means to deliver a mixture of liquids of different optical properties at said locus.

13. A vaporizer for use with solar energy comprising an outer casing, an inner casing member, a substantially hemi-spherical transparent closure fixed to said outer casing, means to concentrate solar energy at a locus within said transparent closure and substantially within said inner casing member, and means to deliver a mixture of liquids of different optical properties at said locus, the liquid which is in engagement with said transparent closure being substantially unheated by said solar energy.

14. A vaporizer for use with solar energy comprising an outer casing, an inner casing member, a substantially hemispherical transparent closure fixed to said outer casing, means to concentrate solar energy at a locus within said transparent closure and substantially within said inner casing member, and means to deliver a mixture of liquids of different optical properties at said locus, said liquids being under substantial pressure.

15. A vaporizer for use with solar energy comprising an outer casing, an inner casing member, a substantially hemispherical transparent closure fixed to said outer casing, means to concentrate solar energy at a locus within said transparent closure and substantially within said inner casing member, and means to deliver a mixture of liquids of different optical properties at said locus, said inner casing member having a restricted outlet passage for the vaporized liquid.

16. A vaporizer for use with solar energy comprising an outer casing, an inner casing member, spacing supports between said casing and casing member, a transparent closure for the end of said outer casing, means to direct a flow of heat-absorbing liquid between said casing and casing member, within said transparent closure, and within said casing member, and means to direct said solar energy through said transparent closure and through said liquid to a focal point substantially within said inner casing member.

17. A vaporizer for use with solar energy comprising an outer casing, an inner casing member, guiding partitions connecting said casing and casing member, a transparent closure for the end of said outer casing, means to direct a flow of heat-absorbing liquid between said guiding partitions, within said transparent closure, and within said inner casing member, and means to direct said solar energy through said transparent closure and through said liquid to a focal point substantially within said inner casing member, and means to add a different liquid thereto within said inner casing member.

18. A vaporizer for use with solar energy comprising an outer casing, an inner casing member, guiding partitions connecting said casing and casing member, a transparent closure for the end of said outer casing, means to direct a flow of heat-absorbing liquid between said guiding partitions, within said transparent closure, and within said inner casing member, means to direct said solar energy through said transparent closure and through said liquid to a focal point substantially within said inner casing member, and means to add a different liquid thereto within said inner casing member, one of said liquids jacketing said inner casing member to prevent loss of heat therefrom.

In testimony whereof I have hereunto affixed my signature.

ROBERT H. GODDARD.